(No Model.)
H. H. MAY.
ANIMAL TRAP.
No. 444,760. Patented Jan. 13, 1891.
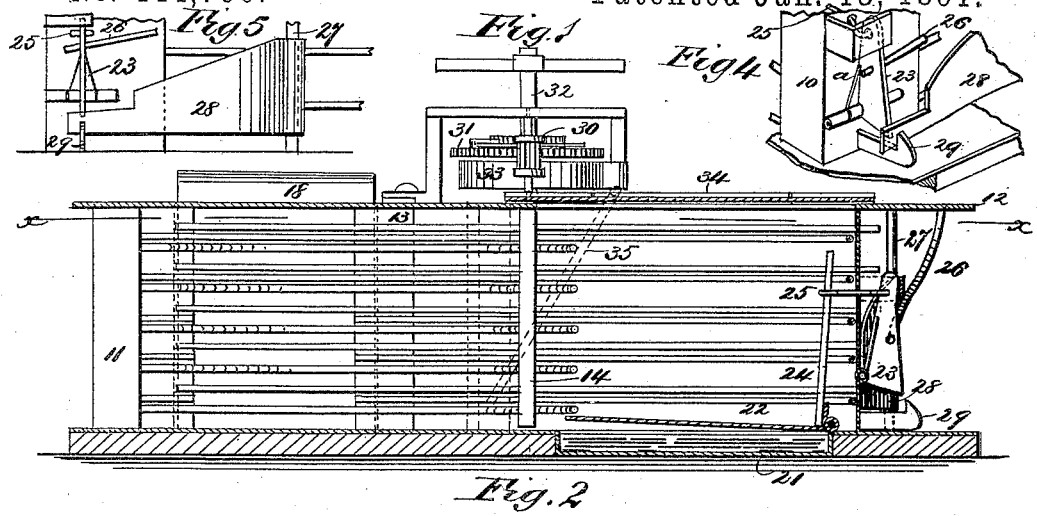
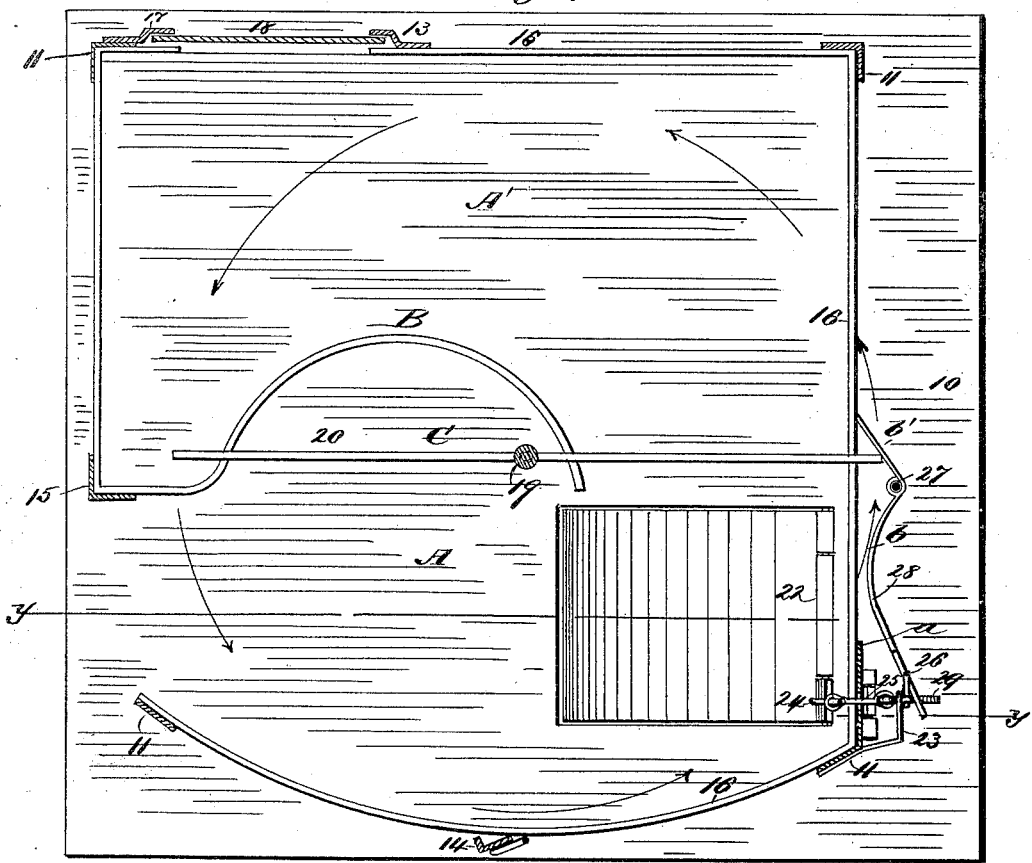
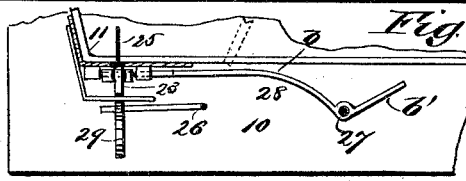
WITNESSES:
F. McArdle
C. Sedgwick
INVENTOR:
H. H. May
BY
Munn & Co
ATTORNEYS

UNITED STATES PATENT OFFICE.

HENRY H. MAY, OF NEW ALBIN, IOWA, ASSIGNOR TO HIMSELF, WELLS GILLETTE, AND LEWIS HAYS, OF SAME PLACE.

ANIMAL-TRAP.

SPECIFICATION forming part of Letters Patent No. 444,760, dated January 13, 1891.

Application filed September 19, 1890. Serial No. 365,462. (No model.)

*To all whom it may concern:*

Be it known that I, HENRY H. MAY, of New Albin, in the county of Allamakee and State of Iowa, have invented a new and useful Improvement in Animal-Traps, of which the following is a full, clear, and exact description.

My invention relates to an improvement in animal-traps, and has for its object to provide a trap of exceedingly simple and durable construction, and also to provide a means whereby a turnstile contained in the trap will act automatically the moment the platform is pressed and before the bait is touched to force the animal from the platform into a cage or prison compartment; and a further object of the invention is to provide a means whereby at each operation the turnstile will automatically set itself for the next operation.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a vertical transverse section taken practically on the line $y\,y$ of Fig. 2. Fig. 2 is a horizontal section taken practically on the line $x\,x$ of Fig. 1. Fig. 3 is a plan view of the trip-latch and keeper. Fig. 4 is a perspective view of the latch and a partial perspective view of the keeper, and Fig. 5 is a side elevation of the keeper and an edge view of the latch.

The trap may be of any desired contour. Preferably, however, it is practically rectangular, and the base or bottom 10 is made square. From the base or bottom 10 at or near each corner a post 11 is upwardly projected, which post may consist of an angle-iron, if so desired. The posts are connected at their upper ends with a cover-plate 12, which plate constitutes the top of the trap. The cover-plate of the trap and its base extend, preferably, some distance beyond the corner-posts. At the sides of the trap intermediate posts 13 and 14 are preferably erected, and at the front of the trap an intermediate post 15 is also erected. The side of the trap at which the post 13 is located is preferably straight and is made up of a series of bars or rods 16, preferably of wire, and connected with the corner-post 11 and intermediate post 13. The intermediate post 13 is so formed as to constitute a slideway, and the opposite corner-post has an angle iron or plate 17 attached thereto, constituting an opposite slideway. The opening between the post 13 and the angle-plate 17 in this side of the trap is closed, preferably, by a vertically-sliding door 18. The rear end of the trap is likewise constructed of bars or rods 16, which extend from one corner-post 11 to the opposite corner-post. The side of the trap opposite that containing the sliding gate or door is preferably convexed or curved, and the intermediate post 14 and the corner-post at the front are located to admit of such construction. This side is also made up entirely of rods or bars of wire or metal 16. The corner-post at the junction of the curved side with the back is preferably made considerably wider at the back than are the other corner-posts, the rear member $a$ being the widest member. The space between the corner-post 11 at the front of the trap and the intermediate post 15 is not closed.

The trap is divided practically into two compartments A and A', the compartment A being what may be termed a "reception compartment" and the compartment A' a "cage or prison compartment." The division into compartments is effected, preferably, by a partition B, which partition consists of a series of wire rods also, extending from the intermediate post 15 to about the center of the trap. The forward end of the partition is straight; but the remaining portion is preferably curved inward in the direction of the compartment A' and outward in the direction of the compartment A, as best shown in Fig. 2.

It will be understood that the sides and partitions when constructed of wire consist of a series of rods extending at suitable intervals from the top to the bottom of the trap.

Just inside of the curved inner end of the intermediate partition B a turnstile C is journaled in the top and bottom of the trap. This turnstile consists of a central post 19 and lateral rods or arms 20, radiating from opposite sides of the post. The arms of the turnstile are adapted to pass between the rods of the intermediate partition and likewise between the rods forming the rear side of the trap.

In the bottom of the compartment A, near the back, an opening is formed, which opening has fitted therein a well 21, and above the said opening a platform 22 is located, the said platform being hinged at its rear end to the rear wall of the opening. This platform is normally retained in a tilted position by engagement with a lock-latch 23, pivoted at or near its rear end upon the member $a$ of the larger corner-post 11. The platform at one corner of its hinged end has attached thereto an upwardly-extending rod 24, upon which dry bait—such as corn, seed or meat—may be placed, and a link connection 25 is effected between the upper end of this bait-rod and the upper end of the lock-latch 23, the platform being held elevated principally through the medium of a spring 26, which spring is attached to the top of the trap at one end and is connected with the lock-latch at its opposite end, exerting a downward pressure continually upon the latch.

At the back of the trap a vertical post 27 is located, and upon the said post a keeper 28 is fulcrumed. The keeper consists of a metal plate somewhat triangular in general contour, which plate is provided with an eye or socket surrounding the post 27, and the plate is bent inward and outward from the socket in the direction of the latch 23, forming thereby an inner convexed surface $b$. The extremity of the curved member of the keeper is adapted to be engaged upon its inner face by the lower end of the latch 23, and thereby pressed outward to an engagement with a stop 29, attached to the bottom of the trap, as illustrated in Fig. 4. The opposite end of the keeper is bent at a sharp angle inward, as illustrated at $b'$, and when the curved member of the keeper is engaged by the latch 23 the angular member is virtually brought into engagement with the rear face of the trap, as illustrated in Fig. 2. When the keeper is in the position shown in the said figure, the turnstile is held transversely across the trap by the extremities of its rear arms engaging with the member $b'$ of the keeper.

The turnstile may be manipulated by any suitable form of motor, either weight or spring, that illustrated consisting of a simple spring-motor comprising a lantern-wheel 30, connected with the upper end of the post of the turnstile, which lantern-wheel engages with a spur-wheel 31, mounted on a post 32, controlled by a spring 33, the said post being provided with the usual form of ratchet and pawl.

In operation the motor is wound up, and the curved member of the keeper is brought in engagement with or is forced outward by the latch 23, whereupon the platform 22 is elevated and the angular member of the keeper retains the turnstile in a transverse position, thereby closing the opening at one side of the platform between the intermediate partition B and the rear of the trap, as shown in Fig. 2. The moment that an animal enters the compartment A and treads upon the platform the platform is depressed, and the bait-rod 24, through the medium of the link 25, acts upon the upper end of the latch 23 in such manner as to elevate the lower end of the said latch, whereupon it is disengaged from the keeper, and the motor, acting at all times upon the turnstile, forces the said stile to revolve in the direction indicated by the arrows in Fig. 2, as the rear arms are at this time free to pass the angular member of the keeper, and as the stile revolves the arms that were pointing forward sweep the animal from the platform through the opening between the rear of the trap and the intermediate partition into the prison-compartment A', and as the forward arms of the turnstile revolve, they come in engagement with the convexed surface $b$ of the keeper, and in so doing press the outer end of the curved member outward a sufficient distance to admit of the spring 26 pressing the latch 23 downward to an engagement with the keeper, again restoring it to its locked position. As the rear arms of the turnstile approach the keeper they engage with the angle member $b'$ and the revolution of the stile is immediately stopped, and it is retained in its normal position ready for action when the next animal treads upon the platform. The animals may be removed from the prison compartment A' by lifting the gate or door 18, or communication may be established between the opening covered by the door and a suitable cage.

It will be understood that any style of bait may be employed, either solid or liquid. The space beneath the platform may be readily cleaned by removing the well 21, which well may contain a liquid bait, if so desired.

If in practice it is found desirable, a door 34 may be formed in the top of the trap immediately over the platform to facilitate the placing of the bait, in which event the door is held in a closed position by a spring-keeper 35, or its equivalent.

Having thus described my invention, I claim as new and desire to secure by Letters Patent—

1. A trap having a vertical turnstile provided with a motor, a horizontal keeper 28, pivoted between its ends, with its longer curved arm $b$ projecting into the path of the turnstile to be thrown outward thereby, to throw its shorter arm $b'$ inward into the path of the stile and prevent its rotation, a vertically-movable latch holding the said longer arm $b$ in its outward position, a connection between said vertically-movable latch and the entrance portion of the trap to cause the entering animal to operate the latch and thereby release the keeper 28, substantially as set forth.

2. A trap partially divided into two compartments, a vertical turnstile completing said division and provided with a motor, the tilting platform having a vertical rod 24, the vertically-swinging latch 23, pivoted between its ends, a link 25, connecting the upper end of the latch with said platform-rod, a horizontal latch pivoted between its ends and extending at both sides of its pivot into the path of the turnstile, as shown at $b\ b'$, the part $b$ being held outward by the lower end of latch 23, and a spring pressing the latch outward above its pivot, substantially as set forth.

HENRY H. MAY.

Witnesses:
S. W. GILLETTE,
LEWIS HAYES.